3,349,664
OPTICAL COLLIMATION DEVICE
Charles W. Kohlenberger, Fullerton, Calif., assignor to
North American Aviation, Inc.
Filed May 22, 1962, Ser. No. 196,743
4 Claims. (Cl. 88—14)

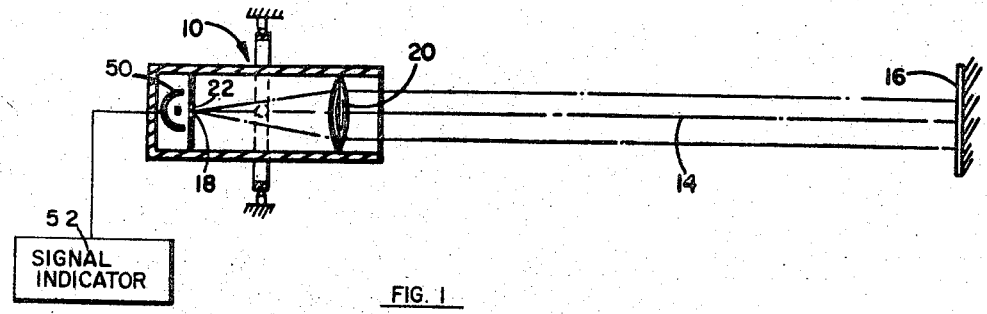
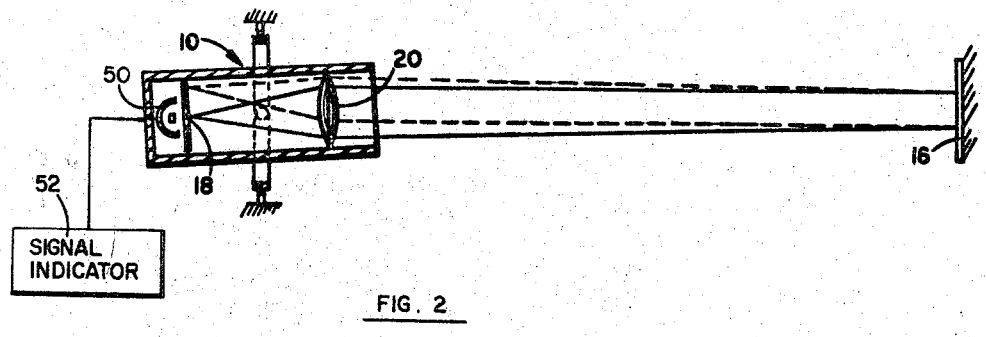
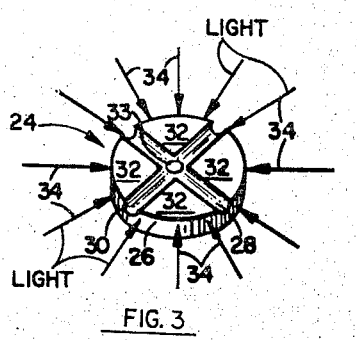
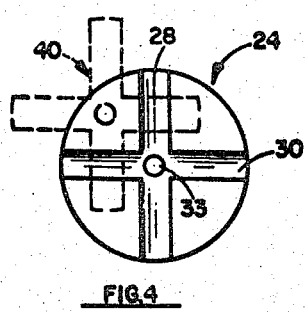
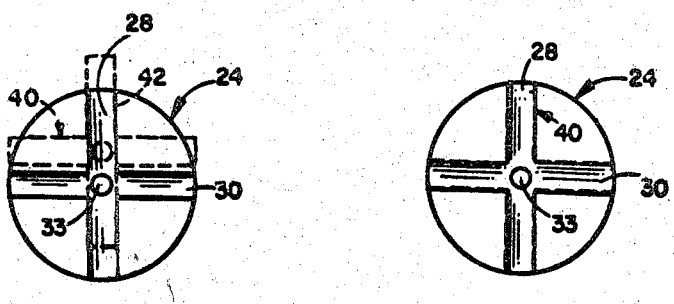
Oct. 31, 1967  C. W. KOHLENBERGER  3,349,664
OPTICAL COLLIMATION DEVICE
Filed May 22, 1962
INVENTOR.
CHARLES W. KOHLENBERGER

This invention relates to an optical device; and more particularly to an optical device of the type that uses a telescope.

Background

It is generally known that vehicles such as missiles, ships, submarines, etc. may use an optical device known as a "start finder," which periodically searches for selected stars to check the course of the vehicle. The information obtained from the star finder is fed to the navigation system of the vehicle; and is used to update the information and operation of the navigation equipment.

For the purposes of explanation, the following discussion will be conducted in terms of a star-finding system; although it will be shown later that my invention is applicable to other types of devices, such as astronomical telescopes, surveying instruments, and the like.

In general, the star-finding system operates as follows. When a vehicle is at its home port, and is being prepared for a trip, all of the equipment such as telescopes, gyroscopes, compasses, etc. are suitably oriented and calibrated in terms of the latitude and longitude of the port. After the vehicle has been underway for an interval of time, the star-finding system is brought into play, and a telescope searches for a pre-selected star. When the star is located, the angle of the telescope is fed to the various navigation computers, which correlate and/or correct the operation of the various pieces of equipment associated therewith.

For a more specific example: Assume that after traveling for a given length of time, it is desired to find a star, or stars, for the purpose of checking the whereabouts or the heading of the vehicle. At this time—according to the navigation system—a particular star should be in sight. The computer therefore points the telescope in the direction in which the pre-selected star should be found; and if the star is located at that angle, it indicates that everything has worked perfectly.

If however, the start is not found at that particular angle, the computer directs the telescope to search for the star; and when the star is found, the angle at which it was found is fed back to the equipment.

The discrepancy between the computed angle of the telescope and the actual angle of the telescope may have been caused by errors that could have occurred in a number of places; one of these places being in the telescope-pointing or the telescope-mounting equipment itself.

Objects and drawings

It is therefore the principal object of my invention to provide apparatus for checking the telescope-pointing and the telescope-mounting mechanism.

It is another object of my invention to provide an arrangement that permits the telescope to more quickly locate the object for which it is searching, with respect to a well established angular reference.

The attainment of these objects and others will be realized from the following specification taken in conjunction with the drawings, of which:

FIGURES 1 and 2 are symbolic representations of the path taken by light rays under certain conditions;

FIGURE 3 is a pictorial representation of one part of the subject optical device; and FIGURES 4–6 are representations of the relation between the telescope's object and image.

Synopsis of the invention

Broadly speaking, my invention contemplates apparatus for checking the telescope-mounting and telescope-pointing mechanism before, or after, the telescope is used for sighting. It incorporates a novel device that acts as an object when the telescope is used for the checking operation.

Introduction

The star-finding telescope is usually mounted in a protecting housing, and the telescope searches for a star by suitable pivoting in a horizontal and vertical manner. In this way the telescope can scan across any desired portion of the sky. The starlight entering the telescope passes through its optical system and through an aperture, and then impinges upon a photo tube. This converts the light to an electrical signal, which is applied to various utilization devices. When the star has been located, the particular angle at which the telescope is positioned is also fed to utilization devices.

Description of the invention

My invention may be understood from FIGURE 1. Before, or after, the star-finding procedure, a checking operation is performed. For this, the telescope 10 is turned to a predetermined orientation, i.e., along a "checking axis." Assume for simplicity, that the telescope is aimed horizontally along the longitudinal axis of the vehicle; and that the angular relation between the telescope and the checking axis is called "zero orientation." With the telescope 10 in this position, its optical axis 14 coincides with the checking axis and a fixedly-positioned flat mirror 16 is placed perpendicular to these axes.

If a light, or a virtual object, is positioned at the focal point 18 of the telescope, the optical imaging system 20 of the telescope causes parallel (collimated) rays of light to emerge from the telescope. These collimated light rays impinge upon the perpendicularly positioned mirror 16, and are reflected from the mirror back to the telescope. Since the reflected light rays are parallel, they are converged at the focal point 18, and pass through the aperture 22 to impinge upon a photo tube 50 which provides a signal to signal indicator 52.

A device used in this way is known as an "autocollimator;" and, in the past, was used to determine the angular position of the mirror. It should be noted that I check the positioning and orientation of the telescope.

Assume now that during the checking operation, when the telescope is positioned at its "zero" orientation, the image produced by the light reflected from the mirror does not impinge upon the focal point 18; the path of the reflected light being shown by the dotted lines of FIGURE 2. This condition indicates that some change had taken place in the telescope-mounting or telescope-pointing mechanism, so that the present "zero" angle of the telescope is not exactly the same "zero" angle as had been set originally. As a result, the angle readings fed to the utilization device would be erroneous.

In order to correct this situation, I cause the telescope to search for the image in a same manner as it has previously searched for a star. When the searching procedure positions the image at the focal point of the telescope, the precise angle at which this condition occurs is transmitted to the various utilization devices; where it is used to either reset the "zero" angle of the telescope mechanism or, to correct the computations made after that time.

Typical mechanisms for finding and tracking stars are shown and described in United States Patent No. 2,820,906 for "Radiant Energy Sensing System," U.S. Patent No. 2,939,962 for "Fixed Beam Scanner," 2,941,081 for "Stellar Orientation Detector," 2,943,204 for "Star Sensing System," 2,967,246 for "Moving Field Scanner," and 3,018,378 for "Radiant Energy Scanning System," all assigned to North American Aviation, Inc.

If the light source used in the autocollimating operation were a point source of light, when the telescope searched for the image of the point source of light, an appreciable length of time would elapse before the minute image was found.

This is objectionable; not only becaues of the time element, but also from the point of view of usage, and wear and tear on the mechanism and the computer.

In accordance with my invention, the prior-art point source of light is replaced by a source of light that takes a cruciform configuration. This result may be achieved by using a device 24, such as is shown in FIGURE 3. This device may comprise a disc 26 of light-conducting material having grooves 28 and 30 preferably in the form of a "plus" sign. The upper flat surface 32 of the device is made opaque, while the grooves 28 and 30 are kept clear; so that the center of the device 24 is transparent and acts as an aperture 33. Alternatively aperture 33 may be a cylindrical or conical hole having opaque walls. The device is "side-lighted," as shown by arrows 34, so that light enters the clear sides of disk 26, and is emitted by the clear cross-shaped pattern formed by the grooves. Thus the "object" of the optical system is an illuminating cruciform.

When the telescope mechanism is properly set, and a checking operation is performed, light from the cruciform configuration leaves the telescope in the form of parallel rays, impinges upon the mirror, is reflected back into the telescope, and is focused in the focal plane of the telescope.

If the telescope mechanism had shifted in some way, and the telescope was not perpendicular to the mirror, the reflected light would impinge upon the focal plane in the form of an image shown by the dotted cruciform pattern 40 of FIGURE 4. It will be seen that under these conditions no light would enter the aperture 33; and that no signal would be fed to the utilization devices. As a result, the telescope may be moved to search for the reflected light.

Assume for the moment, and for simplicity, that the search pattern causes the telescope to move horizontally from its position shown in FIG. 4. At a given position, the vertical bar 42 of the reflected image 40 will coincide with the vertical groove of the object, as shown in FIG. 5. Light now passes through the aperture 33 to be converted to an output signal which is applied to signal indicator 52.

This immediately indicates that the telescope is in the proper horizontal orientation, but must be moved either upward or downward in order to cause the image to coincide with the object. The telescope is then moved upwards; and if the light passing through the aperture does not decrease, the telescope is then moved downward until at a given position, the horizontal bar of the reflected image 40 will coincide with the horizontal groove of the object. At this point, a minimum of light passes through the aperture 33 since aperture 33 is reflected back upon itself. By following this simple procedure, vertical and horizontal positioning may be obtained.

Since a circular pattern is easier to generate than a rectangular pattern, the plus-shaped object can be moved in a circular pattern. As the various arms cross the aperture, the positions of the objects are noted, and are fed to utilization devices.

It may thus be seen that due to my novel cruciform-shaped object, the reflected image is found much more quickly than would otherwise be possible. Moreover, since this checking operation may be conducted just before the star-finding procedure, it will be seen that any deviation in the telescope-pointing or telescope-mounting mechanism will be quickly found, and may be taken into consideration during the actual star-finding procedure.

In this way, my device insures more satisfactory results from the star-finding procedure.

It will be apparent that the assumed zero orientation of the telescope may actually be any convenient orientation in the vehicle. Moreover, if desired, the reflecting mirror may be mounted on a stabilized platform functionally associated with the computer.

*Advantages*

It will be realized that my invention has decided advantages over prior art practices. Firstly it permits the telescope pointing and mounting mechanism to be periodically checked, and thus tends to minimize any errors that may occur in this portion of the apparatus. Secondly the use of my novel cruciform object permits the telescope to more quickly find the object it is searching for during the checking operation.

While my invention has been discussed in terms of a cruciform pattern, it is obvious that other patterns, such as an X, may be satisfactorily used; and that my inventive concept may be used for other telescopic devices.

Although the invention has been described and illustrated in detail, it is to be understood that the same is by way of illustration and example only and is not to be taken by way of limitation, the spirit and scope of this invention being limited only by the terms of the appended claims.

I claim:
1. In combination:
   an alignment instrument including an optical system having an optical axis, a focal plane and a focal point;
   a device comprising a disc of transparent material, a pair of intersecting grooves positioned in one surface of said disc, a light passing aperture at the intersection of said grooves, and an opaque layer on the ungrooved smooth portions of said one surface, said disc being positioned with said one surface in said focal plane, with the intersection of said grooves at said focal point;
   means for side-lighting said disc whereby said grooves act as the object of said optical system;
   means for collimating the beam of light from said grooves and for projecting said collimated beam of light from said alignment instrument;
   a mirror fixedly mounted substantially perpendicular to said optical axis and substantially perpendicular to said collimated beam of light whereby said mirror reflects said collimated beam of light, said means for collimating being operative to image said reflected collimated beam of light onto the focal plane of said alignment instrument; and
   means for moving said alignment instrument so that the image of said reflected collimated beam of light may be aligned with said grooves in said disc.

2. The combination of claim 1 wherein said pair of intersecting grooves in said disc are perpendicularly positioned in said one surface so as to form a plus sign.

3. The combination of claim 1 further comprising:
   photo-electric means positioned adjacent to said aperture to detect that portion of said reflected collimated beam of light imaged at said focal point of said alignment instrument.

4. The combination of claim 1 wherein said disc of transparent material forms a cruciform light source in the focal plane of said alignment instrument; and photo-electric means positioned adjacent to said aperture to receive light passing therethrough and adapted to generate signals in response to said light.

References Cited

UNITED STATES PATENTS

| | | | |
|---|---|---|---|
| 2,420,503 | 5/1947 | Stechbart | 88—1 |
| 2,481,551 | 9/1949 | Williams | 88—1 |
| 2,520,866 | 8/1950 | Wells | 88—14 |
| 2,797,485 | 7/1957 | Lewis | 88—14 |
| 2,870,671 | 1/1959 | Falconi | 88—14 |
| 3,005,376 | 10/1961 | Evans | 88—14 |
| 3,023,504 | 3/1962 | Benford | 33—50 |
| 3,079,835 | 3/1963 | Saperstein | 88—14 |
| 3,107,270 | 10/1963 | Hildebrand | 88—32 |
| 3,121,163 | 2/1964 | Rickert. | |
| 3,175,458 | 3/1965 | Costa | 88—14 |
| 3,220,299 | 11/1965 | Reisinger | 88—14 |

OTHER REFERENCES

Keuffel and Esser Co., Precision Visual and Elecontric Auto Collimators, 1961, pp. 2 and 3.

JEWELL H. PEDERSEN, *Primary Examiner.*

T. L. HUDSON, CHARLES E. QUARTON,

*Assistant Examiners.*